April 18, 1933.   H. F. CARTER   1,904,853
METHOD OF AND APPARATUS FOR PREPARING AND HANDLING MOLTEN MATERIALS
Filed Nov. 12, 1930
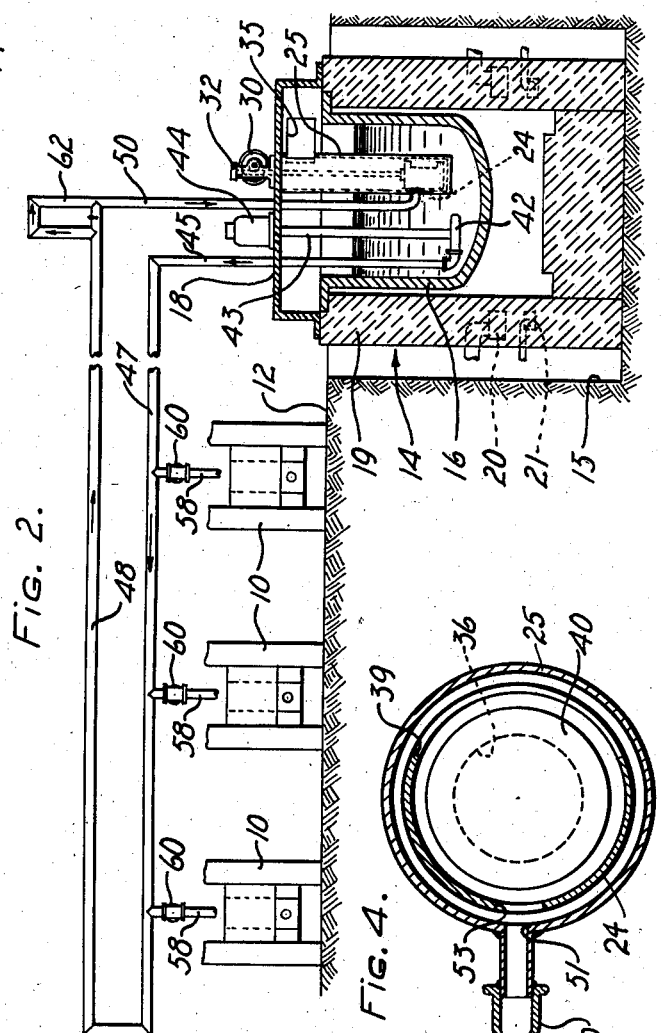
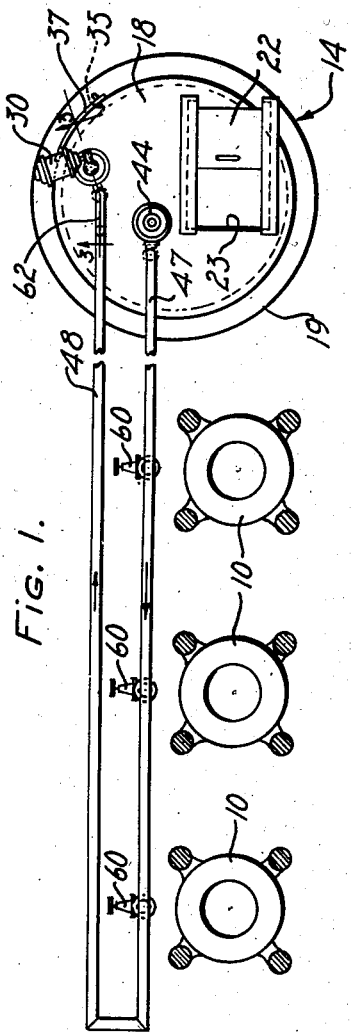
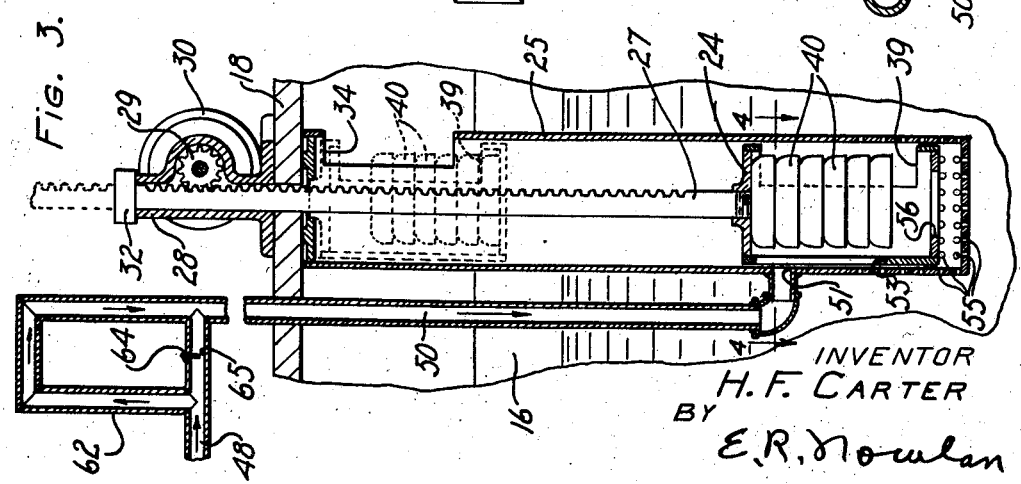
INVENTOR
H. F. CARTER
BY E. R. Nowlan
ATTORNEY Patented Apr. 18, 1933

1,904,853

UNITED STATES PATENT OFFICE

HERBERT F. CARTER, OF ROSELLE PARK, NEW JERSEY, ASSIGNOR TO WESTERN ELECTRIC COMPANY, INCORPORATED, OF NEW YORK, N. Y., A CORPORATION OF NEW YORK

METHOD OF AND APPARATUS FOR PREPARING AND HANDLING MOLTEN MATERIALS

Application filed November 12, 1930. Serial No. 495,056.

This invention relates to methods of and apparatus for preparing and handling molten materials, and more particularly to a method of and apparatus for preparing and distributing lead antimony alloys employed in cable sheath.

Objects of the present invention are to provide an efficient and economical method of and apparatus for preparing and handling molten materials.

One embodiment of the invention contemplates the provision of a method and apparatus for preparing and handling molten alloys, particularly lead antimony alloys employed in the extrusion of a protective sheathing for certain types of telephone cables, wherein the lead pigs are melted in a large tank or kettle, and the antimony, in cake form, is placed in an open container which is lowered into the bottom portion of the kettle, after which the molten lead is pumped from the kettle, and returned thereto through a pipe line which discharges into the bottom portion of the kettle and against the antimony to thereby dissolve it and thoroughly mix it with the molten lead. The mixed molten alloy is pumped from the kettle through a pipe line arranged to supply the alloy to a plurality of cable sheath extruding presses, the pipe line having an inverted U-shaped portion or by-pass extending upwardly above the highest point in the line to exclude air therefrom and thereby prevent oxidation within the line.

A more complete understanding of the invention will be had from the following detailed description when taken in conjunction with the accompanying drawing, wherein Fig. 1 is a schematic plan view of an apparatus embodying the features of the invention, and by means of which the improved method may be practiced;

Fig. 2 is a schematic elevational view thereof, partly in section;

Fig. 3 is an enlarged fragmentary vertical section on line 3—3 of Fig. 1, and

Fig. 4 is a fragmentary horizontal section on line 4—4 of Fig. 3.

Referring now to the drawing, wherein like reference numerals designate corresponding parts throughout the several views, it will be observed that a plurality of spaced extruding presses 10, 10 (shown schematically in Figs. 1 and 2) are arranged in a straight line upon a common foundation or floor 12. Spaced from the right hand end of the line of presses and to the rear thereof is a large tank or kettle 14 which is mounted in a pit 15 in the floor and comprises a melting pot 16 provided with a hood 18 and surrounded by a cylindrical wall 1 of a suitable heat insulating material. A plurality of large and small gas burners 20 and 21, respectively, are provided for heating and maintaining the contents of the melting pot 16 at a predetermined temperature. By employing all of the burners, the contents of the melting pot may be quickly heated to the predetermined temperature, after which this temperature may be maintained by employing only the smaller burners.

A sliding door 22 (Fig. 1) is provided over an opening 23 in the top of the kettle hood, through which opening a charge of lead, in billet or pig form, is lowered into the melting pot by means of a suitable grapple controlled by an overhead crane or the like (not shown). A cylindrical receptacle or container 24 (Fig. 3) is mounted for vertical movement in a cylindrical guide 25 depending from the hood 18 into the melting pot 16. The container 24 is carried at the lower end of a vertically reciprocable rack bar 27 which is slidable in a tubular bracket 28 secured to the hood and is operated by a pinion 29 driven by an electric motor 30. An enlarged head or flange 32 formed at the upper end of the rack bar engages the top of the bracket 28 to limit the downward movement of the container 24, the upward movement thereof being limited by its engagement with the underside of the hood 18.

An opening 34 in the upper portion of the cylindrical guide 25 registers with a side opening 35 (Fig. 1) in the kettle hood which is normally closed by a sliding door 37. The container 24 is provided with a side opening 39 which registers with the openings 34 and 35 when the container is elevated to its loading position indicated in dotted outlines in Fig. 3. Through these openings, a charge of antimony 40, in cake form, may be readily and conveniently loaded into the container 24.

Mounted in the lower portion of the melting pot 16 is an impeller type pump 42 (Fig. 2) which is driven through a vertical shaft 43 from an electric motor 44 supported upon the kettle hood 18. A vertical pipe 45 connected to the pump 42 extends upwardly through the hood 18 and is connected at its upper end to one end of a horizontal main supply line 47 which extends along the line of presses and is connected at its opposite end to one end of a horizontal main return line 48 disposed above the supply line. The return line 48 is connected to a vertical pipe line 50 which extends into the melting pot 16 and discharges into the antimony container guide 25 through an opening 51 therein (Fig. 3). It will be observed that a side opening 53 in the upper portion of the antimony container 24 registers with the opening 51 when the container is in its lowermost position in the melting pot. It will be noted, also, that the lower portion of the antimony container guide 25 is provided with a plurality of spaced perforations 55, 55, and a large aperture 56 is provided in the bottom of the antimony container, the purpose of which will become apparent as the detailed description progresses.

Communicating with and depending from the supply line 47 at each of the extruding presses 10 is a pipe line or "downspout" 58 provided with a valve 60 through which the molten alloy may be supplied to the individual presses, as required. A portable trough or chute (not shown) may be provided for guiding the molten alloy from the downspout into the cylinders of the presses.

A by-pass 62 (Figs. 2 and 3) is provided in the return line 48 near its junction with the vertical return line 50 of the kettle. This by-pass is in the form of an inverted U which extends upwardly above the highest point in the supply and return lines and is connected at its ends to the return line 48. A baffle plate 64 is provided in the return line intermediate its junctions with the ends of the by-pass 62, as best shown in Fig. 3. The function of the baffle plate is to cause substantially all of the molten alloy to pass through the by-pass 62 and thereby exclude air from the pipe lines with the exception of the vertically disposed portions 50, thus eliminating oxidation in the lines 45, 47 and 48. It will be noted, however, that the baffle plate provides a restricted opening 65 through the main return line 48 for drainage purposes.

In the operation of the above described apparatus, a predetermined amount of lead is deposited into the melting pot 16, wherein it is melted by the burners 20 and 21. A predetermined amount of antimony, in solid cake form, is then placed in the antimony container 24, after which the container is lowered into the molten lead in the manner hereinbefore described. By confining the antimony within the container, its buoyant tendency to rise to the surface of the molten lead, due to its lower specific gravity, is overcome and the antimony is thus maintained fully submerged in the molten lead in the lower portion of melting pot.

After the pipe lines have been heated by any suitable means (not shown), the molten lead is pumped from the melting pot through the pipe lines, returning into the melting pot through the return pipe 50 which discharges against the antimony through the opening 51 in the antimony container 24. The antimony is thus dissolved, at a temperature considerably lower than its melting temperature, by the continuous stream of molten lead coming from the discharge end of the pipe 50 and returning into the melting pot through the aperture 56 in the bottom of the antimony container and the apertures 55 in the lower portion of the cylindrical guide 25. The dissolved antimony, having a lower specific gravity than lead, tends to rise to the surface of the molten lead and is thus uniformly mixed therewith as the alloy is circulated and recirculated through the pipe lines.

It will be obvious that as soon as the uppermost cake of antimony in the container is dissolved the next cake of antimony moves upwardly against the top of the container due to its buoyancy, as explained above. Thus, one or more cakes of antimony are constantly maintained in the path of the stream of molten lead coming from the return pipe 50, until all of the antimony is dissolved.

After a uniformly mixed alloy of the desired consistency has been obtained, it may be drawn, as required, from the downspouts 58 into the cylinders of the extruding presses 10. It is to be understood, of course, that the molten alloy may be transferred from the melting pot 16 into a suitable storage tank from which it may be supplied to the extruding presses in the same manner as described above. Also, it is obvious that numerous other changes and modifications may be made in the specific embodiment of the invention herein illustrated and described without departing from the spirit and scope of the invention, as defined in the appended claims.

What is claimed is:

1. A method of preparing a lead antimony alloy, comprising melting a predetermined quantity of lead, submerging a predetermined amount of antimony in the molten lead, and directing a stream of the molten lead against the submerged antimony to dissolve it and thoroughly mix it with the lead.

2. A method of preparing a molten alloy from a solid material having a relatively low melting point and high specific gravity and a soluble solid material having a relatively high melting point and low specific gravity, comprising melting the first mentioned material, submerging the soluble material in the melted material, and directing a stream of the melted material against the submerged material to dissolve it.

3. In an apparatus for preparing molten materials, means for melting a normally solid material and for maintaining it in a molten state, means for submerging a plurality of layers of a soluble solid material having a specific gravity less than that of the molten material in the molten material, and means for directing a stream of the molten material against the upper layers of said submerged solid material to dissolve said upper layers and to permit the lower layers of said solid material to move upward into the position previously occupied by said upper layers.

4. In an apparatus for preparing molten materials, a melting pot, a container movable to a plurality of positions with respect to the melting pot and adapted to maintain a plurality of layers of cakes of solid material having a specific gravity less than that of the molten material below the surface of said molten material and to permit the lower of said layers to move upward into the positions occupied by the upper layers after said upper layers have been dissolved, and means communicating with the container in one of said positions for directing molten material from the melting pot against said upper layers of said solid material into the container.

5. In an apparatus for preparing molten materials, a melting pot for melting a material and maintaining it in a molten state, a vertically movable container for receiving material and for holding such material at a predetermined position within the melting pot, and means communicating with the container at said position for directing molten material from the melting pot against material contained in the container.

6. In an apparatus for distributing molten materials, a kettle for holding a supply of molten material, a distribution line having a substantially horizontally disposed portion of varying height communicating with the kettle and having a by-pass disposed above the highest point in the line, means for directing the molten material from the kettle through the distribution line, and means for causing substantially all of the material to flow through the by-pass to exclude air from that portion of the line between said supply kettle and said by-pass.

7. In an apparatus for preparing molten materials, a melting pot for melting a material and maintaining it in a molten state, a container for holding a plurality of layers of soluble solid material having a specific gravity less than that of the molten material, means for causing a relative movement between the melting pot and the container to submerge the soluble material in the molten material, and means for directing a stream of the molten material against the upper layers of said soluble material.

In witness whereof, I hereunto subscribe my name this 30th day of October A. D., 1930.

HERBERT F. CARTER.